United States Patent [19]

Rosen et al.

[11] Patent Number: 5,473,601
[45] Date of Patent: Dec. 5, 1995

[54] FREQUENCY REUSE TECHNIQUE FOR A HIGH DATA RATE SATELLITE COMMUNICATION SYSTEM

[75] Inventors: Harold A. Rosen, Washington, D.C.; Victor S. Reinhardt, Rancho Palos Verdes, Calif.; Andrew L. Strodtbeck, El Segundo, Calif.; Jennifer L. Vollbrecht, Hermosa Beach, Calif.

[73] Assignee: Hughes Aircraft Company, Los Angeles, Calif.

[21] Appl. No.: 142,160

[22] Filed: Oct. 21, 1993

[51] Int. Cl.⁶ .................................................. H04J 4/00
[52] U.S. Cl. .................. 370/50; 370/75; 370/97; 455/12.1; 455/13.3
[58] Field of Search ........................ 370/18, 50.75, 370/69.1, 120, 77, 78, 79, 97, 110.1, 110.4; 375/1, 7, 39; 455/33.1, 33.3, 33.2, 38.1, 73, 81, 82, 151.2, 227, 228, 11.1, 12.1, 13.1, 13.2, 13.3

[56] References Cited

U.S. PATENT DOCUMENTS

| | | | |
|---|---|---|---|
| 4,425,639 | 1/1984 | Acampora et al. | 455/13.3 |
| 4,931,802 | 6/1990 | Assal et al. | 455/13.3 |
| 5,278,826 | 1/1994 | Murphy et al. | 370/18 |
| 5,321,725 | 1/1994 | Paik et al. | 375/39 |

*Primary Examiner*—Douglas W. Olms
*Assistant Examiner*—Huy D. Vu
*Attorney, Agent, or Firm*—Elizabeth E. Leitereg; Terje Gudmestad; W. K. Denson-Low

[57] ABSTRACT

Frequency reuse and data coding methods for use in a high data rate satellite communication system. The frequency reuse method provides for dual polarization and spatial reuse of transmit and receive beams to provide for a twelve-fold increase in the effective bandwidth and number of users that may be supported by the system. Transmit and receive antennas provide multiple, interleaved transmit and receive antenna beams. Digital input data at a source user terminal is coded and transmitted from a source user terminal on one of the plurality of receive antenna beams. The received data is demodulated and is routed so that it may be transmitted to a destination user terminal. The data is then remodulated, multiplexed, and transmitted to the destination user terminal on one of the plurality of transmit beams. The transmitted data is decoded at the destination user terminal to produce the output data. The input and output data processed by the system is digital, and the coding (concatenated coding forward error correction processing) is employed to reduce the sensitivity of communicated data to interference. The presently preferred encoding method comprises Reed-Solomon encoding input data, interleaving the encoded data, and convolutionally encoding the interleaved data and then time division multiplexing and modulating the data. The presently preferred decoding method comprises demodulating and demultiplexing received time division multiplexed data, Viterbi decoding the demultiplexed data, deinterleaving the Viterbi decoded data, and Reed-Solomon decoding the deinterleaved data to produce the output data. Other multiplexing schemes may alternatively be employed. The demodulating and remodulating steps regenerates a high quality digital data stream on the satellite that is communicated to the destination terminal to reduce the effects of uplink interference upon the downlink data stream.

24 Claims, 4 Drawing Sheets

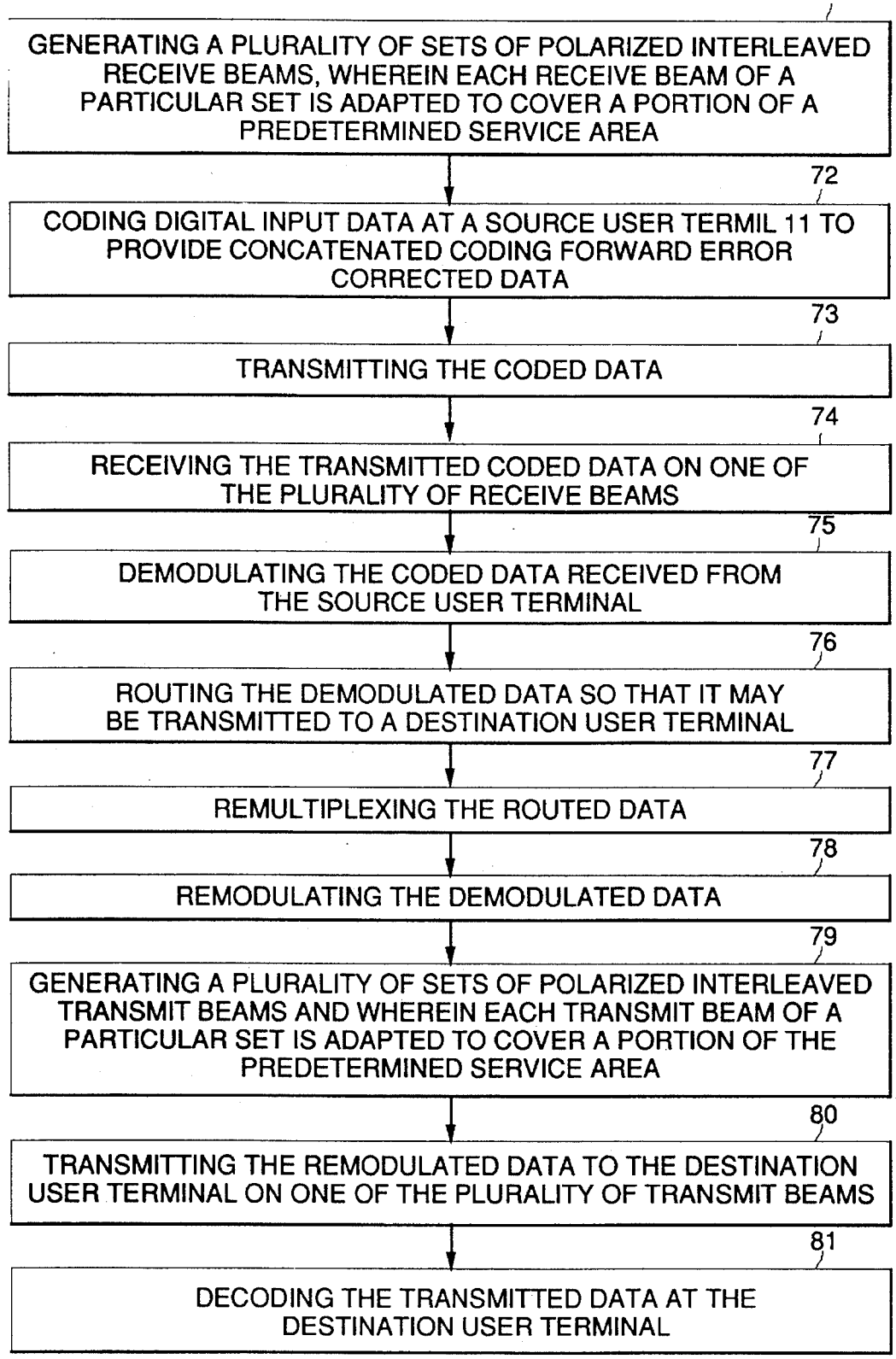

FREQUENCY REUSE TECHNIQUE FOR A HIGH DATA RATE SATELLITE COMMUNICATION SYSTEM

BACKGROUND

The present invention relates generally to satellite communication systems, and more particularly, to a frequency reuse scheme and data coding structure for use with a high data rate satellite communication system that provides data, voice and video communication between individuals.

The past several decades has seen the development of communications systems that have provided for the real-time distribution of information on a global scale. The development of these global communication systems has evolved along several paths that use either ground-based or satellite-based communication. Satellite-based systems have been employed for many years to distribute voice, data and video signals for global broadcasting of news and sporting events, for example. With the advent of newer high power satellite systems and technology, direct broadcast television systems are available that provide for broadcasting of television signals from up to 100 stations using a single satellite. Individuals install an antenna and a satellite receiver to receive the broadcasts directly by way of the satellite and display them on a television monitor.

To provide for more personal communication or teleconferencing between individuals, companies such as AT&T, for example, have developed a video telephone system that employs a small (3–4 inch) television monitor in combination with a conventional telephone. The video telephone system typically uses fiber optic links to provide a sufficient bandwidth to carry the video and voice signals. However, this type of system does not have enough bandwidth to provide for full motion video.

In order to provide for an even more cost-effective solution to personal telecommunication needs, the assignee of the present has developed a high data rate satellite communication system that provides for the communication and distribution of full motion video, voice and data signals, to provide for personal teleconferencing between individuals. This system is disclosed in U.S. patent application Ser. No. 08/142,524, filed Oct. 21, 1993, entitled "High Data Rate Satellite Communication System", assigned to the assignee of the present invention, the contents of which are incorporated herein by reference. This system comprises a plurality of user terminals (VSATs) that are linked by and that communicate with each other by way of a satellite relay system. A network control center provides command signals that control the satellite relay system and coordinate linking of terminals to each other. The system employs frequency division multiplexing on uplinks from the terminals and the network control center to the satellite relay system. The system employs time division multiplexing on downlinks from the satellite relay system to the terminals and the network control center. However, frequency reuse described herein is independent of the multiplexing scheme used on individual links.

In order to provide for the most efficient bandwidth utilization in this high data rate satellite communication system, and to increase the number of users that may be supported by the system, it was necessary to develop a new frequency reuse technique and data coding structure. Accordingly, it is an objective of the present invention to provide for a frequency reuse scheme and data coding structure for use with a high data rate satellite communication system that provides for the communication of data, voice and video between individuals.

SUMMARY OF THE INVENTION

In order to meet the above and other objectives, the present invention provides for a frequency reuse method, and a data coding structure, for use with a high data rate satellite communication system. The satellite communication system comprises a plurality of small user terminals that are linked by and that communicate with each other by way of a satellite relay system. Communication is achieved from terminal to terminal in a single hop. A network control center provides command signals that control the satellite relay system and coordinate linking of terminals to each other. The system employs frequency division multiplexing on uplinks from the terminals and the network control center to the satellite relay system. The system employs time division multiplexing on downlinks from the satellite relay system to the terminals and the network control center. However, it is to be understood that other multiplexing schemes may be readily used in either of the links. Each user terminal comprises a transceiver for modulating and demodulating input and output dam, and an antenna for transmitting and receiving encoded data to and from the satellite relay system. Additionally, a user terminal that is configured for receiving/transmitting video contains a data compression circuit for compressing input data and decompressing output data.

The satellite relay system is comprised of a satellite, a wide area antenna capable of transmission and reception, a plurality of satellite receive antennas, a plurality of satellite transmit antennas, and a signal processor. The wide area antenna is provided for communicating command and control signals between the user terminals and the network control center. The plurality of satellite receive antennas operate in a first frequency band and produce a first plurality of beams that cover a predefined service area. The plurality of satellite receive antennas are adapted to receive frequency division multiplexed data from a source user terminal on a first beam. The plurality of satellite transmit antennas operate in a second frequency band and produce a second plurality of beams that cover the service area. The plurality of satellite transmit antennas are adapted to transmit the time division multiplexed data to a destination user terminal on a second beam. However, it is to be understood that other multiplexing schemes other than those specifically disclosed herein may be readily used. The second beam may be geographically colocated with the first beam, depending upon the respective locations of the source and destination user terminals.

The signal processor is adapted to demodulate data received on the first beam from the source user terminal. It then routes the demodulated data so that it can be transmitted on the second beam to the destination user terminal. The signal processor then remodulates the demodulated data to provide encoded data. Finally the signal processor transmits the data on the second beam to the destination user terminal.

The present frequency reuse method comprises the following steps. A plurality of sets of polarized interleaved receive beams are generated using the plurality of receive antennas and each receive beam of a particular set is adapted to cover a portion of a predetermined service area. Digital input data at a source user terminal is coded to provide concatenated coding forward error corrected data. The coded data is transmitted. The transmitted coded data is received on one of the plurality of receive beams at the satellite. The coded data received from the source user terminal is demodulated. The demodulated data is routed so that it may be transmitted to a destination user terminal. The routed data is remultiplexed and remodulated. A plurality of sets of polarized interleaved transmit beams are generated using the plurality of transmit antennas and wherein each transmit beam of a particular set is adapted to cover a portion of the predetermined service area. The remodulated data is transmitted to the destination user terminal on one of the plurality of transmit beams. The transmitted data is decoded at the destination user terminal. The input and output data processed by the communication system comprises digital data, and concatenated coding forward error correction processing is employed to reduce the sensitivity of communicated data to interference. The demodulating and remodulating steps regenerates a high quality digital data stream on the satellite that is communicated to the destination terminal to reduce the effects of uplink interference upon the downlink data stream.

Coding the digital input data comprises the steps of encoding input data, such as by Reed-Solomon coding, for example, interleaving the encoded data, convolutionally encoding the interleaved data, multiplexing the convolutionally encoded data, modulating the multiplexed data, and transmitting the modulated data. Decoding the transmitted data at the destination user terminal comprises the steps of demodulating received modulated data, demultiplexing the demodulated data, decoding the demultiplexed data, such as by Viterbi decoding, for example, deinterleaving the decoded data, and decoding the deinterleaved data to produce the output data.

The present invention provides for a frequency reuse and data coding method that is used in a high data rate satellite communication system. Multi-fold frequency reuse is key to achieving low utilization costs for the high data rate satellite communication system. The present invention provides for the use of dual polarization and spatial reuse of the transmit and receive beams to provide for a twelve-fold increase in the effective bandwidth and number of users that may be supported by the system. The designs of the transmit and receive antennas provides multiple, interlaced antenna beams that illuminate the entire geographic area of interest. Four separate antenna apertures are each used to provide respective receive and transmit beams, resulting in the use of eight total apertures. This allows for generation of the interlaced overlapping beams without the use of complex beamforming networks that adds cost and complexity, and incurs circuit loss that degrades the sensitivity and effective radiated power of the satellite relay system.

The present invention provides for a six-fold reuse of each of two electromagnetic wave polarization pairs, providing for twelve-fold total reuse of the system frequency bandwidth. This produces a spatial separation of about one full beam radius between reused beams. In order to provide this high level of frequency reuse, the system is tolerant of the interference that is inevitable when several beams operate at the same frequency and polarization. In the present system, this tolerance is achieved by three things. First, all communication signals are provided in the digital domain. This eliminates onerous signal-to-noise requirements that are typical of analog modulation such as FM-TV, FDM-FM telephony, and other similar services. Second, the present invention uses concatenated coding forward error correction techniques to further reduce the sensitivity of the communicated signals to interference. Finally, demodulation and remodulation processing on-board the satellite effectively regenerates a high quality digital data stream on the satellite. The regeneration provide by the remodulation processing greatly reduces the impact of uplink interference upon the downlink stream.

The concatenated code forward error correction begins when the digital input signal (user data) is processed by a Reed-Solomon encoder. The Reed-Solomon encoded data is then interleaved in an interleaver and passed to a convolutional encoder. The output of the convolutional encoder is then passed to a multiplexer and a modulator. The data is then decoded either on-board the satellite or at the destination user terminal. A demodulator and a demultiplexer are employed to demodulate and demultiplex received digital data. Following demodulation and demultiplexing, the digital data is passed to a Viterbi decoder. After decoding, the data is deinterleaved in a deinterleaver and processed by a Reed-Solomon decoder. If the data is decoded onboard the satellite, then the decoded data is re-encoded before it is remultiplexed and remodulated.

The use of the convolutional code with Viterbi decoding mitigates the effects of typical satellite link noise sources and turns a digital signal with a high probability of bit error into the digital signal with a moderate bit error probability. Interleaving mitigates the effect of the very bursty errors typical of the Viterbi decoder, and distributes the errors among the blocks which are passed to the Reed-Solomon decoder. The Reed-Solomon decoder is highly effective at turning moderately error-ridden digital streams into streams with a very low probability of bit error.

Protocols have also been developed for use with the high speed satellite communication system that allocate satellite resources and establish, monitor and tear down point-to-point communication links between user terminals. Such protocols are described in U.S. patent application Ser. No. 08/141,779, filed Oct. 21, 1993, entitled "Communication Protocol for a High Data Rate Satellite Communication System", assigned to the assignee of the present invention, the contents of which are incorporated herein by reference. Once the communication link between the user terminals is established, input data generated at a user terminal is frequency division multiplexed and transmitted to the satellite relay system. The satellite relay system demodulates the data, routes it so that it is retransmitted on a beam that communicates with the second terminal, remodulates the data, and then transmits the time division multiplexed data to the second terminal.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3, comprising

FIG. 5 illustrates the basic frequency reuse method 70 in accordance with the present invention.

DETAILED DESCRIPTION

Figure 1:
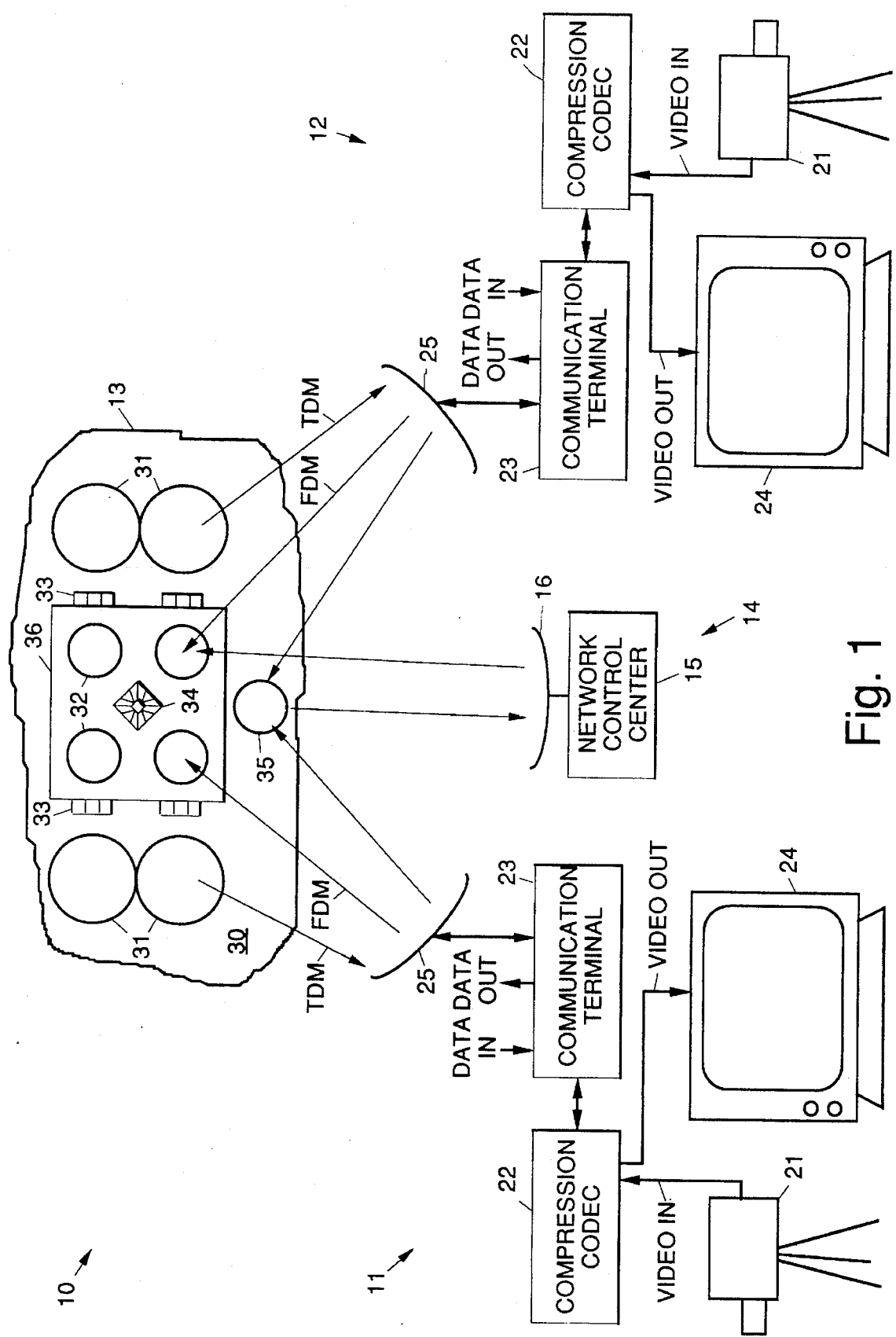
FIG. 1 illustrates a high data rate satellite communication system in which the present invention may be employed.

Referring to the drawing figures, FIG. 1 illustrates a high data rate satellite communication system 10 in which the present invention may be employed. The system 10 comprises a plurality of user terminals (VSAT's) 11, 12 (corresponding to first and second user terminals 11, 12) that are linked by and that communicate with each other by way of a satellite relay system 13. A network control center 14 provides command signals that control the satellite relay system 13 and coordinate linking of terminals 11, 12 to each other. The system 10 uses frequency division multiplexing on uplinks from the terminals 11, 12 and the network control center 14 to the satellite relay system 13. The system 10 uses time division multiplexing on downlinks from the satellite relay system 10 to the terminals 11, 12 and the network control center 14.

Each user terminal 11, 12 comprises a data compression coder/decoder (CODEC) circuit 22 for compressing input data and decompressing output data, a transceiver 23 for modulating and demodulating input and output data, and an antenna 25 for transmitting and receiving encoded data to and from the satellite relay system 13. In the alternative, and in the case of data communication (opposed to video), the compression circuit 22 is replaced by interface circuitry that is adapted to interface to a data source, such as a local area network, a terminal or computer, or a data communication line, or the like. The satellite relay system 13 is comprised of a satellite 30, a plurality of receive antennas 32, a plurality of transmit antennas 31, a wide area antenna 35, and a signal processor 36. Respective pluralities of feed horns 33, 34 are provided to feed data to and from the respective transmit and receive antennas 31, 32. The wide area antenna is provided for communicating configuration and control signals between the user terminals 11, 12 and the network control center 14. The network control center 14 comprises a control processor 15 for generating configuration and control signals that link the user terminals 11, 12 by way of the satellite relay system 13, and an antenna 16 coupled to the control processor 15 for transmitting and receiving the configuration and control signals.

The plurality of receive antennas 32 operate in a first frequency band and produce a first plurality of beams (FIG. 2) that cover a predefined area. The plurality of receive antennas 32 receive frequency division multiplexed data from the first user terminal 11 on a first beam. The plurality of transmit antennas 31 operate in a second frequency band and produce a second plurality of beams that cover the predefined area. The plurality of transmit antennas 31 transmit the time division multiplexed data to the second user terminal 12 on a second beam. It is to be understood that the second beam may be geographically colocated with the first beam, depending upon the respective locations of the source and destination user terminals 11, 12.

The signal processor 36 is adapted to demodulate frequency division multiplexed data received on the first beam from the first user terminal 11, route the demodulated data so that it is transmitted on the second beam to the second user terminal 12, remodulate the demodulated data to provide encoded data comprising time division multiplexed data, and transmit the frequency division multiplexed data on the second beam to the second user terminal 12. However, it is to be understood that other multiplexing schemes other than those specifically disclosed above may be readily used.

Figure 2:
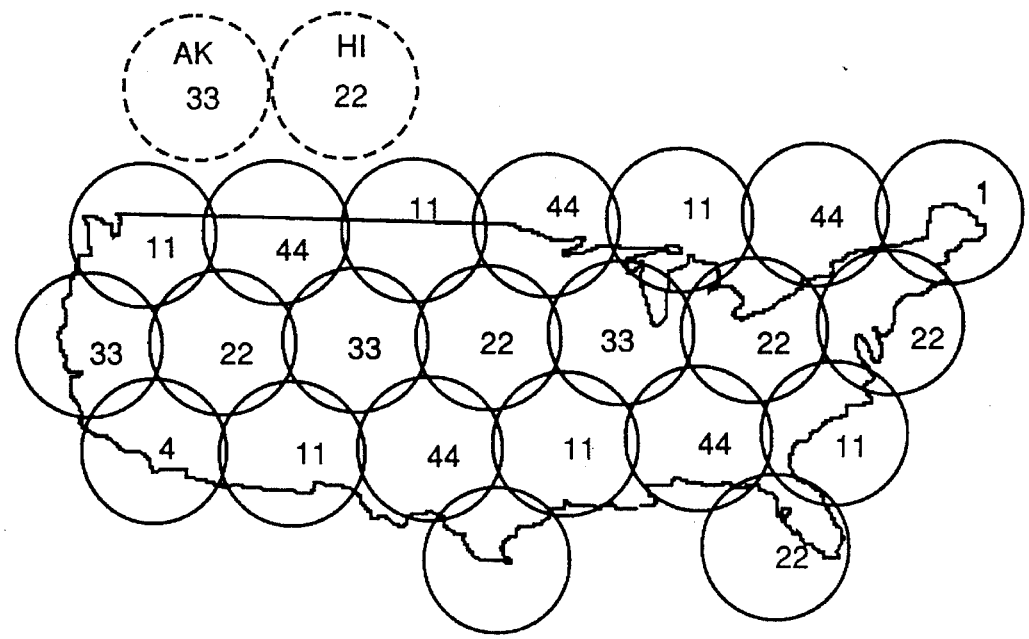
FIG. 2 illustrates a beam pattern employed by the system 10 of FIG. 1 that implements the frequency reuse scheme in accordance with the principles of the present invention.
Figure 3A:
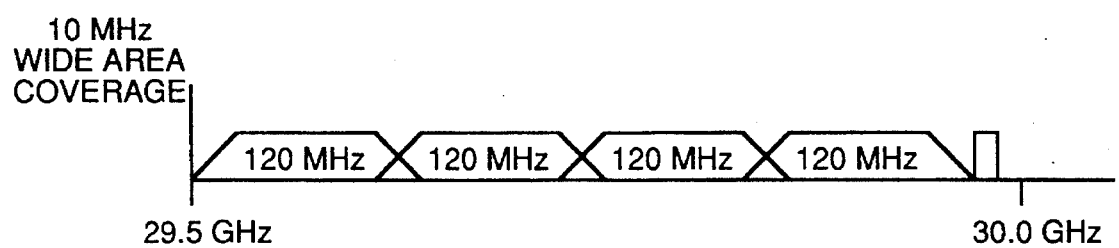
FIGS. 3a and 3b, show the characteristics of uplink and downlink beams of the beam pattern shown in FIG. 2.
Figure 3B:
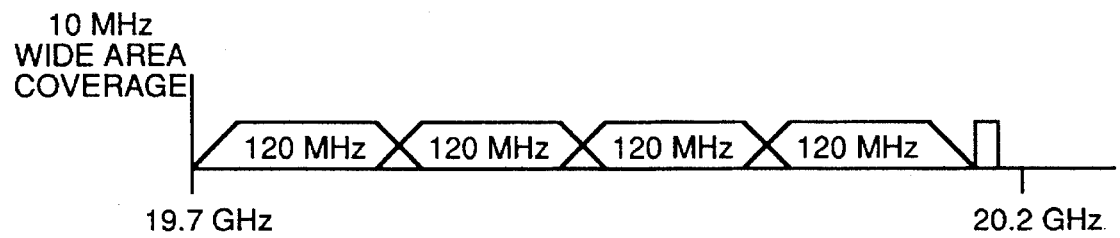

FIG. 2 illustrates a typical beam pattern employed by the system 10 of FIG. 1. FIG. 2 shows the use of 24 beams that completely cover a desired operating area; in this case the continental United States, Alaska (AK) and Hawaii (HI). The respective beams are number with an identifying number (1, 2, 3, 4) that indicates which respective subband is assigned to each beam. The subbands are illustrated in FIGS. 3a and 3b. More particularly, FIGS. 3a and 3b show the characteristics of uplink and downlink beams of the beam pattern shown in FIG. 2. As can be seen from FIG. 2, twenty-four beams each having two polarization states (right hand circularly polarized, RHCP, left hand circularly polarized, LHCP, for example), are employed to obtain full coverage of the United States. However, it is to be understood that different polarization states, such as linear polarization, may be readily employed in the system 10. The eight subbands shown in FIG. 3 are thus reused twelve times to achieve full duplex (transmit and receive) coverage. FIG. 3a shows the transmit bands that comprise four 120 MHz subbands and a 10 MHz wide area coverage subband that extends from 29.5 GHz to 30.0 GHz. FIG. 3b shows the receive bands that comprise four 120 MHz subbands and a 10 MHz wide area coverage subband that extends from 19.7 GHz to 20.2 GHz. These frequencies are in the Ka band.

Figure 4:
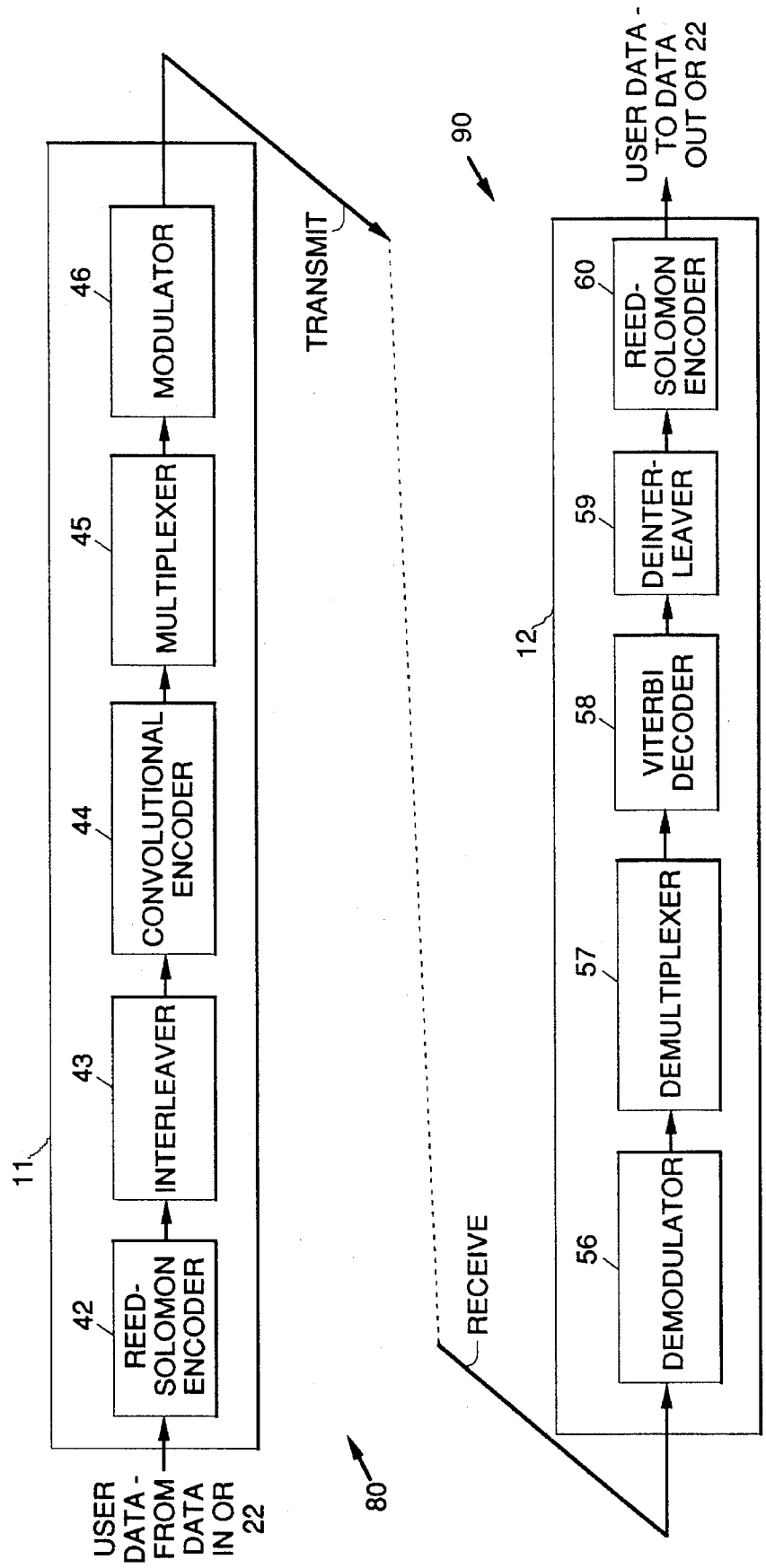
FIG. 4 illustrates a concatenation coding and decoding structure employed in the satellite communication system of FIG. 1.

FIG. 4 illustrates a concatenation coding and decoding structures and methods 80, 90 employed in the system 10 of FIG. 1, and in particular in each of the user terminals 11, 12. The details of the coding arid decoding structure and methods 80, 90 employed in the user terminals 11, 12 are as follows. The concatenated code forward error correction begins when the digital input signal (user data) is processed by a Reed-Solomon encoder 42. The Reed-Solomon encoded data is then interleaved in an interleaver 43 and passed to a convolutional encoder 44. The output of the convolutional encoder 44 is then passed to a multiplexer 45 and a modulator 46.

The data is then decoded either on-board the satellite or at the destination user terminal 12. As shown in FIG. 4, a demodulator 56 and a demultiplexer 57 are used to demodulate and demultiplex received digital data. Following demodulation and demultiplexing, the digital data is passed to a Viterbi decoder 58 deinterleaved in a deinterleaver 59 and processed by a Reed-Solomon decoder 60. If the data is decoded on-board the satellite 30, then the decoded data is re-encoded before it is remultiplexed and remodulated. For a better understanding of this hardware, reference is made to the above-cited U.S. patent application Ser. No. 08/142,524, filed Oct. 21, 1993, entitled "High Data Rate Satellite Communication System", which provides a more detailed description of the concatenation coding and decoding processing and hardware.

The use of the convolutional code with Viterbi decoding mitigates the effects of typical satellite link noise sources and turns a digital signal with a high probability of bit error into the digital signal with a moderate it error probability. Interleaving mitigates the effect of the very bursty errors typical of the Viterbi decoder 58, and distributes the errors among the blocks which are passed to the Reed-Solomon decoder 60. The Reed-Solomon decoder 60 is highly effective at turning moderately error-ridden digital streams into streams with a very low probability of bit error. Thus, for example, a satellite link with a probability of bit error of one error in less than 100 bits for an uncoded digital stream may achieve a probability of bit error of less than one error in $10^{12}$ bits using a concatenated code comprising an 8 error correcting Reed-Solomon code with block size of 255 8-bit characters, sufficient interleaver depth, and optimal rate ⅔, constraint length 7 convolutional code. It is to be understood, however, that other codes may be readily employed.

Protocols have ben developed to allocate satellite resources and establish, monitor and tear down point-to-point communication links between user terminals 11, 12. Such protocols are described in U.S. patent application Ser. No. 08/141,779, filed Oct. 21, 1993, entitled "Communication Protocol for a High Data Rate Satellite Communication System", assigned to the assignee of the present invention, the contents of which are incorporated herein by reference. Once the communication link between the user terminals 11, 12 is established, input data generated at a user terminal 11 is frequency division multiplexed and transmitted to the satellite relay system 13. The satellite relay system 13 demodulates the data, routes it so that it is retransmitted on a beam that communicates with the second terminal 12, remodulates the data in the frequency domain, and then transmits the time division multiplexed data to the second terminal 12.

For the purposes of completeness, FIG. 5 illustrates the basic frequency reuse method 70 in accordance with the present invention. The first step 71 comprises generating a plurality of sets of polarized interleaved receive beams, wherein each receive beam of a particular set is adapted to cover a portion of a predetermined service area. The next step 72 comprises coding digital input data at a source user terminal 11 to provide concatenated coding forward error corrected data. The next step 73 comprises transmitting the coded data. The next step 74 comprises receiving the transmitted coded data on one of the plurality of receive beams. The next step 75 comprises demodulating the coded data received from the source user terminal 11. The next step 76 comprises routing the demodulated data so that it may be transmitted to a destination user terminal 12. The next step 77 comprises remultiplexing the routed data. The next step 78 comprises remodulating the demodulated data. The next step 79 comprises generating a plurality of sets of polarized interleaved transmit beams and wherein each transmit beam of a particular set is adapted to cover a portion of the predetermined service area. The next step 80 comprises transmitting the remodulated data to the destination user terminal 12 on one of the plurality of transmit beams. The final step 81 comprises decoding the transmitted data at the destination user terminal 12.

The input and output data processed by the communication system 10 comprises digital data, and concatenated coding forward error correction processing (FIG. 4) is employed to reduce the sensitivity of communicated data to interference. The steps of demodulating and remodulating the signal derived from the source user terminal 11 regenerates a high quality digital data stream on the satellite 30 that is communicated to the destination user terminal 12 to reduce the effects of uplink interference.

The present invention thus provides a frequency reuse scheme for use in a high data rate system 10. Multi-fold frequency reuse in accordance with the present invention is a key to achieving low utilization costs for the system 10. The use of dual polarization and spatial reusing the transmit and receive beams achieves a twelve-fold increase in the effective bandwidth and number of users that are supported by the system 10. A simple antenna design achieves multiple, interleaved antenna beams by using four separate antennas 31, 32 for both receive and transmit beams. This antenna design provides for eight total apertures. This allows generation of interleaved and slightly overlapping beams without use of complex beamforming networks that add cost and complexity to the system 10, and incur circuit loss that degrades the sensitivity of the satellite relay system 13 and effective radiated power from the antennas 31, 32. This implementation provides for six-fold reuse of each frequency polarization pair (12-fold total) and guarantees a spatial separation of about one full beam radius between reused beams.

The present invention thus provides for a six-fold reuse of each of two electromagnetic wave polarization pairs (RHCP and LHCP, or horizontal and vertical, for example), providing for twelve-fold total reuse of the frequency bandwidth of the system 10. This produces a spatial separation of about one full beam radius between reused beams. In order to provide this high level of frequency reuse, the system 10 is tolerant of the interference that is inevitable when several beams operate at the same frequency and polarization. In the system 10, this tolerance is achieved by three things. First, all communication signals are generated in the digital domain. This eliminates onerous signal-to-noise requirements that are typical of analog modulation such as FM-TV, FDM-FM telephony, and other similar services. Second, use of concatenated coding forward error correction techniques further reduces the signals sensitivity to interference. Finally, satellite-based demodulation effectively regenerates a high quality digital data stream on the satellite 30. This regeneration greatly reduces the impact of uplink interference. Thereafter, the uplinked data is demodulated, routed to every downlink beam where it is multiplexed with other data channels, then remodulated and downlinked to every user terminal. Each user terminal continually monitors the downlink channel and can recognize and extract messages addressed to it.

Thus there has been described a new and improved frequency reuse scheme and data coding structure for use with a high data rate satellite communication system that provides for data, voice and video communication between individuals. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A frequency reuse method for use with a satellite communication system comprising a plurality of user terminals that are linked by and that communicate with each other by way of a satellite relay system, and wherein each user terminal comprises a transceiver for modulating and demodulating input and output data, and an antenna for transmitting and receiving data to and from the satellite relay system, and wherein the satellite relay system is comprised of a satellite that includes a plurality of receive antennas, a plurality of transmit antennas, and a signal processor that is coupled to the transmit and receive antennas, wherein the frequency reuse method comprises the steps of:

generating a plurality of sets of polarized interleaved receive beams using the plurality of receive antennas, wherein each receive beam of a particular set covers a portion of a predetermined service area;

coding digital input data at a source user terminal to provide coded data comprising concatenated coding forward error corrected data;

transmitting the coded data from the source user terminal to the satellite relay system;

receiving the transmitted coded data at the satellite relay system on one of the plurality of receive beams;

demodulating the coded data in the signal processor;

multiplexing the demodulated data in the signal processor;

modulating the multiplexed data in the signal processor;

generating a plurality of sets of polarized interleaved transmit beams, wherein each transmit beam of a particular set covers a portion of the predetermined service area; and transmitting the modulated data to the destination user terminal on one of the plurality of transmit beams that covers that portion of the predetermined service area in which the destination user terminal is located.

2. The method of claim 1 wherein the step of coding the digital input data comprises the steps of:

encoding input data;

interleaving the encoded data;

convolutionally encoding the interleaved data;

multiplexing the convolutionally encoded data; and modulating the multiplexed data.

3. The method of claim 1 which further comprises the step of decoding the transmitted data at the destination user terminal.

4. The method of claim 3 wherein the step of decoding the transmitted data at the destination user terminal comprises the steps of:

demodulating received modulated data;

demultiplexing the demodulated data;

decoding the demultiplexed data;

deinterleaving the decoded data; and decoding the deinterleaved data to produce the output data.

5. The method of claim 1 which further comprises the step of decoding the coded data on the satellite subsequent to demodulating the coded data.

6. The method of claim 5 wherein the step of decoding the coded data comprises the steps of:

decoding the demodulated data;

deinterleaving the decoded data; and decoding the deinterleaved data to produce the output data.

7. The method of claim 1 wherein the coding step further comprises frequency division multiplexing the concatenated coding forward error corrected data, and the remultiplexing step comprises frequency division multiplexing the concatenated coding forward error corrected data.

8. The method of claim 1 which further comprises the step of frequency division multiplexing the concatenated coding forward error corrected data prior to transmission, and wherein the multiplexing step comprises time division multiplexing the concatenated coding forward error corrected data.

9. The method of claim 1 wherein the step of coding the digital input data comprises the steps of:

Reed-Solomon encoding input data;

interleaving the encoded data;

convolutionally encoding the interleaved data;

time division multiplexing the convolutionally encoded data; and modulating the time division multiplexed data.

10. The method of claim 6 wherein the step of decoding transmitted data at the destination user terminal comprises the steps of:

demodulating received modulated dam;

demultiplexing the demodulated data;

Viterbi decoding the demultiplexed data;

deinterleaving the Viterbi decoded data; and

Reed-Solomon decoding the deinterleaved data to produce the output data.

11. A frequency reuse method for use with a satellite communication system comprising a plurality of user terminals that are linked by and that communicate with each other by way of a satellite relay system, and wherein each user terminal comprises a transceiver for modulating and demodulating input and output data, and an antenna for transmitting and receiving data to and from the satellite relay system, and wherein the satellite relay system is comprised of a satellite that includes a plurality of receive antennas, a plurality of transmit antennas, and a signal processor that is coupled to the transmit and receive antennas, wherein the frequency reuse method comprises the steps of:

generating a plurality of sets of polarized interleaved receive beams using the plurality of receive antennas, wherein each receive beam of a particular set covers a portion of a predetermined service area;

coding digital input data at a source user terminal to provide concatenated convolutionally encoded data;

frequency division multiplexing the convolutionally encoded data;

modulating the frequency division multiplexed data;

transmitting the modulated data from the source user terminal to the satellite relay system;

receiving the transmitted modulated data at the satellite relay system on one of the plurality of receive beams;

demodulating the modulated data in the signal processor;

time division multiplexing the demodulated data in the signal processor;

modulating the time division multiplexed data;

generating a plurality of sets of polarized interleaved transmit beams, wherein each transmit beam of a particular set covers a portion of the predetermined service area; and transmitting the modulated time division multiplexed data to the destination user terminal on one of the plurality of transmit beams that covers that portion of the predetermined service area in which the destination user terminal is located;

wherein concatenated encoding is employed to reduce the sensitivity of communicated data to interference, and wherein the steps of demodulating and modulating the signal derived from the source user terminal regenerates a high quality digital data stream on the satellite that is communicated to the destination user terminal to reduce the effects of uplink interference.

12. The method of claim 11 wherein the step of coding the digital input data comprises the steps of:

encoding the input data;

interleaving the encoded data; and convolutionally encoding the interleaved data.

13. The method of claim 11 which further comprises the step of decoding the transmitted data at the destination user terminal.

14. The method of claim 11 which further comprises decoding the transmitted data at the destination user terminal in accordance with the steps of:

demodulating received modulated data;

demultiplexing the demodulated data;

decoding the demultiplexed data;

deinterleaving the decoded data; and decoding the deinterleaved data to produce the output data.

15. The method of claim 11 which further comprises the step of decoding the transmitted data on the satellite subsequent to demodulating the modulated data.

16. The method of claim 15 wherein the step of decoding the transmitted data comprises the steps of:

decoding the demultiplexed data;

deinterleaving the decoded data; and decoding the deinterleaved data to produce the output data.

17. The method of claim 11 wherein the step of coding the digital input data comprises the steps of:

Reed-Solomon encoding the input data;

interleaving the encoded data; and convolutionally encoding the interleaved data.

18. The method of claim 17 wherein the step of decoding the transmitted data at the destination user terminal comprises the steps of:

demodulating received modulated data;

demultiplexing the demodulated data;

Viterbi decoding the demultiplexed data;

deinterleaving the Viterbi decoded data; and

Reed-Solomon decoding the deinterleaved data to produce the output data.

19. A frequency reuse method for use with a satellite communication system comprising a plurality of user terminals that are linked by and that communicate with each other by way of a satellite relay system, and wherein each user terminal comprises a transceiver for modulating and demodulating input and output data, and an antenna for transmitting and receiving data to and from the satellite relay system, and wherein the satellite relay system is comprised of a satellite that includes a plurality of receive antennas, a plurality of transmit antennas, and a signal processor that is coupled to the transmit and receive antennas, wherein the frequency reuse method comprises the steps of:

generating a plurality of sets of polarized interleaved receive beams using the plurality of receive antennas, wherein each receive beam of a particular set covers a portion of a predetermined service area;

coding digital input data at a source user terminal to provide coded data comprising concatenated coding forward error corrected data by:

encoding input data;

interleaving the encoded data;

convolutionally encoding the interleaved data;

multiplexing the convolutionally encoded data; and modulating the multiplexed data;

transmitting the coded data from the source user terminal to the satellite relay system;

receiving the transmitted coded data at the satellite relay system on one of the plurality of receive beams;

demodulating the coded data received from the source user terminal in the signal processor;

multiplexing the demodulated data in the signal processor;

modulating the multiplexed data in the signal processor;

generating a plurality of sets of polarized interleaved transmit beams, wherein each transmit beam of a particular set covers a portion of the predetermined service area; and transmitting the modulated data to the destination user terminal on one of the plurality of transmit beams that covers that portion of the predetermined service area in which the destination user terminal is located.

20. The method of claim 19 which further comprises the step of decoding the transmitted data at the destination user terminal by:

demodulating received modulated data;

demultiplexing the demodulated data;

decoding the demultiplexed data;

deinterleaving the decoded data; and decoding the deinterleaved data to produce the output data.

21. The method of claim 19 which further comprises the step of decoding the coded data on the satellite subsequent to routing of the demodulated data by:

decoding the demodulated data;

deinterleaving the decoded data; and decoding the deinterleaved data to produce the output data.

22. The method of claim 19 which further comprises the step of frequency division multiplexing the concatenated coding forward error corrected data prior to transmission, and wherein the multiplexing step comprises time division multiplexing the concatenated coding forward error corrected data.

23. The method of claim 19 wherein the step of coding the digital input data comprises the steps of:

Reed-Solomon encoding input data;

interleaving the encoded data;

convolutionally encoding the interleaved data;

time division multiplexing the convolutionally encoded data; and modulating the time division multiplexed data.

24. The method of claim 21 wherein the step of decoding transmitted data at the destination user terminal comprises the steps of:

demodulating received modulated data;

demultiplexing the demodulated data;

Viterbi decoding the demultiplexed data;

deinterleaving the Viterbi decoded data; and

Reed-Solomon decoding the deinterleaved data to produce the output data.

* * * * *